(12) United States Patent
Lui et al.

(10) Patent No.: US 10,691,570 B1
(45) Date of Patent: Jun. 23, 2020

(54) SOFTWARE ASSISTANT FOR POWER-ON-SELF-TEST (POST) AND BUILT-IN SELF-TEST (BIST) IN IN-VEHICLE NETWORK (IVN) OF CONNECTED VEHICLES

(71) Applicant: Cisco Technology, Inc., San Jose, CA (US)

(72) Inventors: Michael Lui, San Carlos, CA (US); Santosh Patil, Santa Clara, CA (US); Kevin Holcomb, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/279,277

(22) Filed: Feb. 19, 2019

(51) Int. Cl.
| | | |
|---|---|---|
| *G06F 11/00* | (2006.01) |
| *G06F 11/27* | (2006.01) |
| *G01R 31/317* | (2006.01) |
| *H04W 12/08* | (2009.01) |
| *G06F 13/16* | (2006.01) |
| *H04W 4/40* | (2018.01) |

(52) U.S. Cl.
CPC ........ *G06F 11/27* (2013.01); *G01R 31/31723* (2013.01); *G01R 31/31724* (2013.01); *G06F 13/16* (2013.01); *H04W 4/40* (2018.02); *H04W 12/0806* (2019.01)

(58) Field of Classification Search
CPC .......... G06F 11/27; G06F 13/16; H04W 4/40; H04W 12/0806; G01R 31/31723; G01R 31/31724
USPC ................ 714/733, 734, 741, 743, 718, 763
See application file for complete search history.

(56) References Cited

U.S. PATENT DOCUMENTS

| 10,480,431 B1* | 11/2019 | Dudar ................. F02M 25/0809 |
| 2011/0202591 A1* | 8/2011 | Reis ........................ G06Q 10/08 |
| | | 709/203 |
| 2011/0221469 A1 | 9/2011 | Schlagenhaft |

(Continued)

FOREIGN PATENT DOCUMENTS

CN 101334329 12/2008

OTHER PUBLICATIONS

Bernardi, et al., "Fault Grading of Software-Based Self-Test Procedures for Dependable Automotive Applications", 2 pages, 2011, EDAA.

(Continued)

*Primary Examiner* — Christine T. Tu
(74) *Attorney, Agent, or Firm* — Behmke Innovation Group LLC; James M. Behmke; James J. Wong

(57) ABSTRACT

In one embodiment, a technique for performing component self-tests for an in-vehicle network of a vehicle is provided that illustratively comprises: retrieving, by a device in communication with an in-vehicle network (IVN) of a vehicle, a memory sector address of a memory of a component connected to the IVN when a first startup of the vehicle begins, the memory sector address stored in non-volatile memory; performing, by the device, a memory test on a first part of the memory starting at the memory sector address for a predetermined increment during the first startup of the vehicle; and replacing, by the device, the memory sector address with an incremented memory sector address in the non-volatile memory, the incremented memory sector address indicative of the memory sector address incremented by the predetermined increment.

20 Claims, 6 Drawing Sheets

(56) References Cited

U.S. PATENT DOCUMENTS

| | | |
|---|---|---|
| 2011/0258499 A1 | 10/2011 | Casarsa |
| 2016/0232070 A1 | 8/2016 | Schwarz et al. |
| 2019/0260984 A1* | 8/2019 | Nakano ................. G11C 8/04 |

OTHER PUBLICATIONS

Chen, et al., "Software-Based Self-Testing Methodology for Processor Cores", IEEE Transactions on Computer-Aided Design of Integrated Circuits and Systems, vol. 20, No. 3, pp. 369-380, Mar. 2001, IEEE.

Querbach, et al., "A reusable BIST with software assisted repair technology for improved memory and IO debug, validation and test time", 2014 International Test Conference, pp. 1-10, 2014, IEEE, 1-page only.

Sosnowski, Janusz., "Software-based self-testing of microprocessors", Journal of Systems Architecture, 15 pages, 2005, Elsevier B.V.

Turner, et al., "Using the Built-in Self-Test (BIST) on the MPC5777M", Application Note, Document No. AN5131,Rev. 0 , 38 pages, Oct. 2015, Freescale Semiconductor, Inc.

* cited by examiner

US 10,691,570 B1

SOFTWARE ASSISTANT FOR POWER-ON-SELF-TEST (POST) AND BUILT-IN SELF-TEST (BIST) IN IN-VEHICLE NETWORK (IVN) OF CONNECTED VEHICLES

TECHNICAL FIELD

The present disclosure relates generally to computer networks, and, more particularly, to a software assistant for power-on-self-test (POST) and built-in self-test (BIST) in an in-vehicle network (IVN) of connected vehicles.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, such as to route the vehicles to their destinations and avoid roadway hazards. Trials of autonomous vehicles are now being conducted in many cities.

With the increasing computerization of vehicles also comes an increasing push to connect vehicles to other systems (V2X). To provide communications between connected vehicles and the other systems, in-vehicle networks (IVNs) have been introduced to allow sub-systems of connected vehicles to communicate among each other and with systems external to the connected vehicles. Along with the IVNs (and growing complexity of the IVNs), comes an increase in the amount components in the connected vehicles, including microprocessors, network switching hardware, etc. Reliability testing of these components may require additional self-tests to ensure that the components operate without failure(s).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
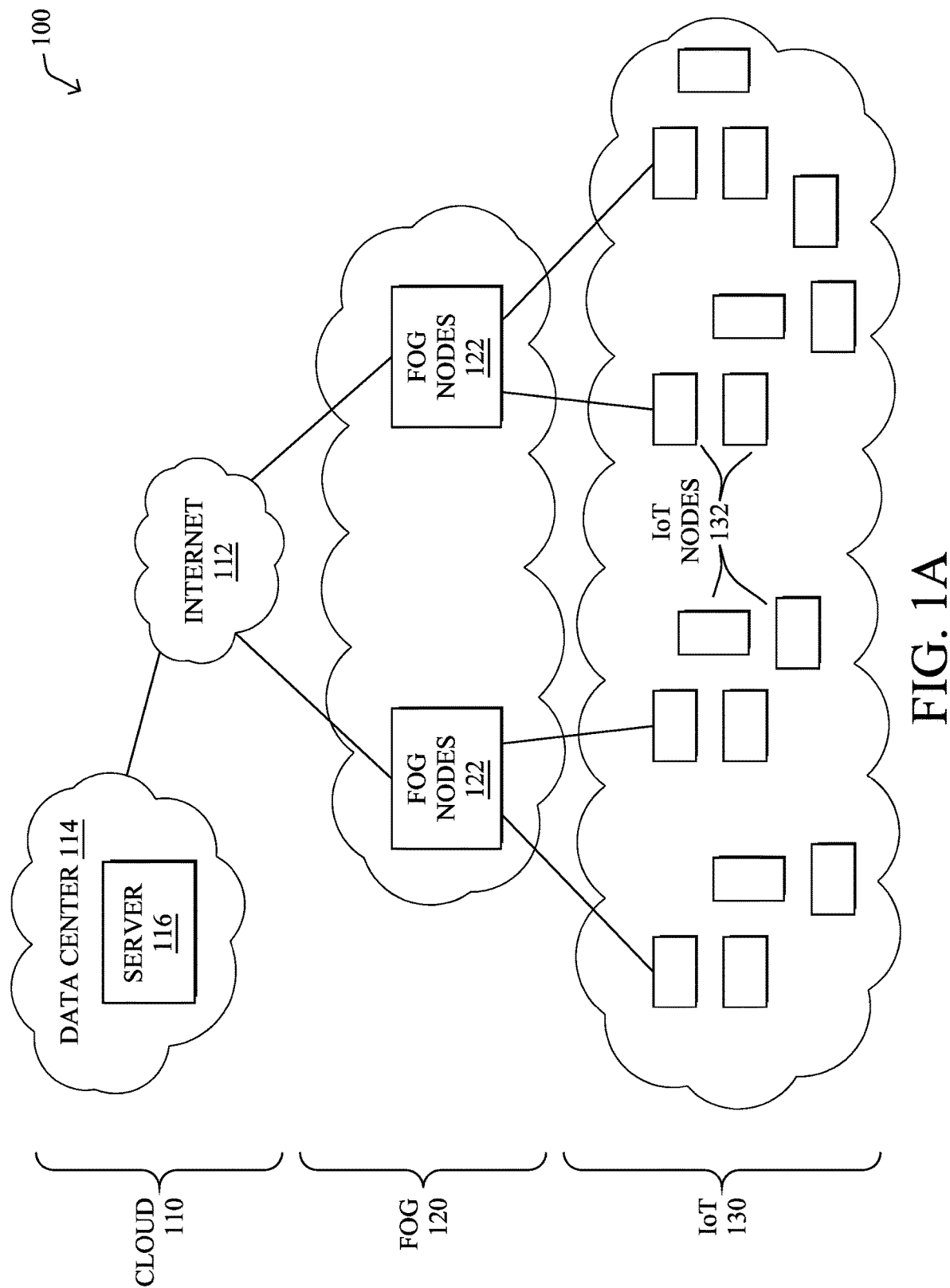
FIGS. 1A-1B illustrate an example communication network.

According to one or more embodiments of the disclosure, techniques herein provide for performing component self-tests for an in-vehicle network of a vehicle. The techniques may illustratively comprise: retrieving, by a device in communication with an in-vehicle network (IVN) of a vehicle, a memory sector address of a memory of a component connected to the IVN when a first startup of the vehicle begins, the memory sector address stored in non-volatile memory; performing, by the device, a memory test on a first part of the memory starting at the memory sector address for a predetermined increment during the first startup of the vehicle; and replacing, by the device, the memory sector address with an incremented memory sector address in the non-volatile memory, the incremented memory sector address indicative of the memory sector address incremented by the predetermined increment.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via Internet Protocol (IP)), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer (P2P) configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
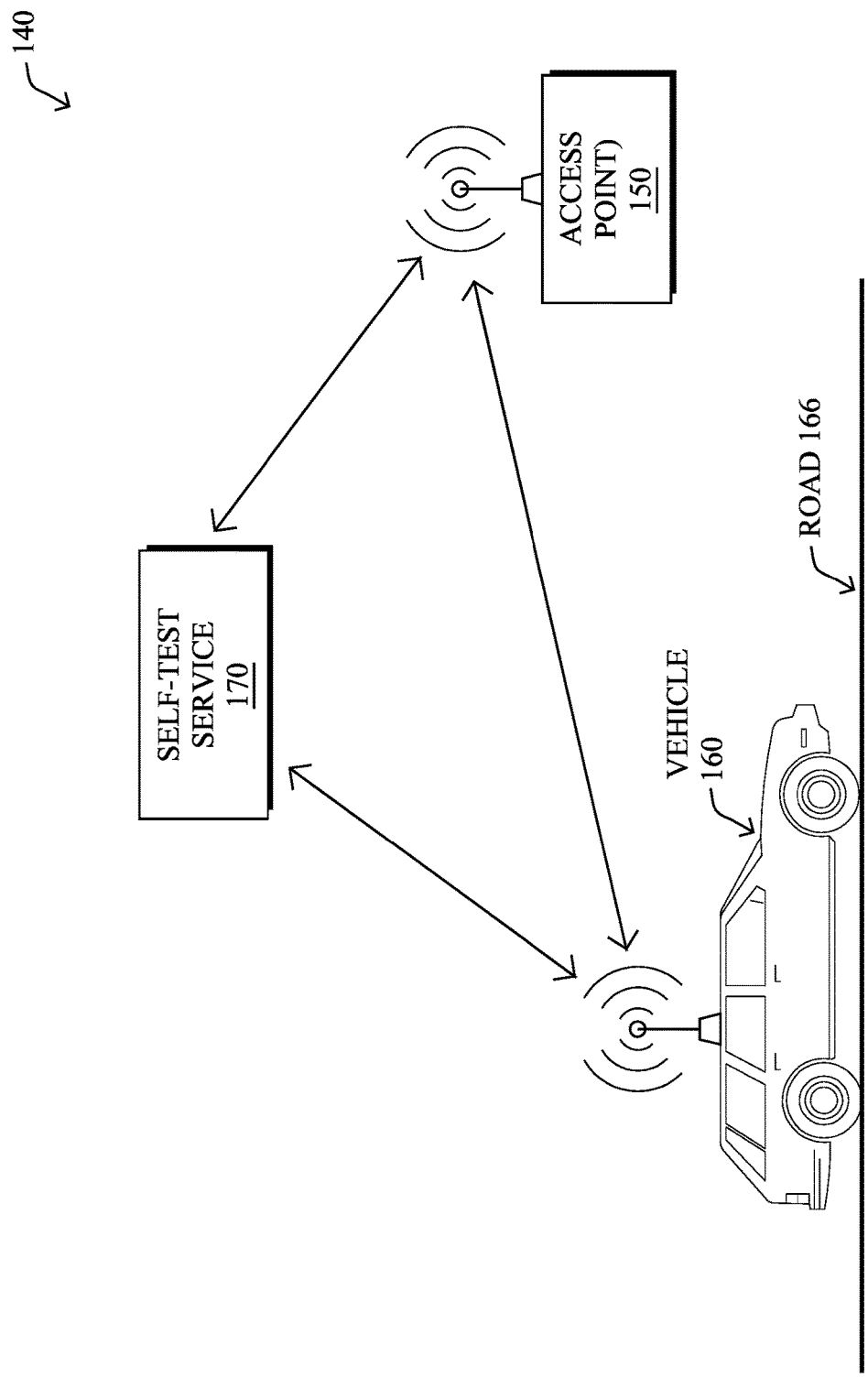

As a specific illustration of a certain type of IoT network, FIG. 1B illustrates an example connected vehicle system 140, according to various embodiments. In particular, connected vehicle system 140 may include any or all of the following components: a vehicle 160 on a road 166, an access point 150, and/or a self-test service 170. During operation, connected vehicle system 140 may be operable to interface vehicle 160 with a backend computer network, such as the Internet, to which self-test service 170 belongs.

In some embodiments, connected vehicle system 140 may be a specific implementation of communication network 100. Notably, self-test service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

The access point 150 may be configured to allocate communicate with self-test service 170 via a WAN, such as the Internet 112 or another WAN. For example, access point 150 may communicate with self-test service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
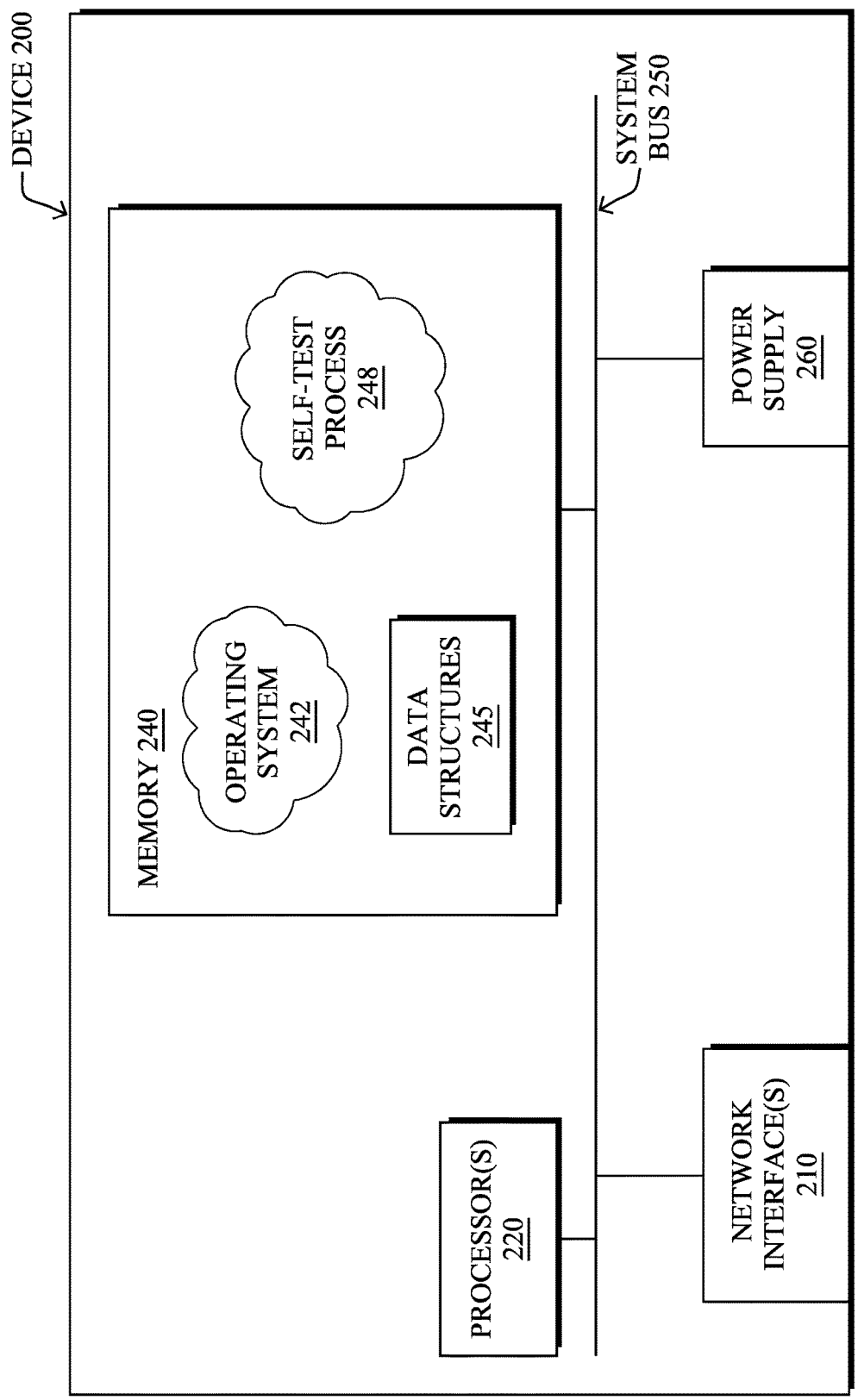
FIG. 2 illustrates an example network device/node.

FIG. 2 is a schematic block diagram of an example computing device/node (e.g., apparatus) 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260 or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative self-test process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

—Software Assistant for Power-On-Self-Test (POST) and Built-In Self-Test (BIST) in In-Vehicle Network (IVN) of Connected Vehicles—

As noted above, in-vehicle networks (IVNs) have been introduced to allow sub-systems (e.g., engine control system, an anti-lock braking system, a navigation system, etc.) of connected vehicles to communicate among each other and with systems (e.g., roadside units (RSUs), other vehicles, computer networks, etc.) external to the connected vehicles. IVNs comprise a plurality of hardware (e.g., field-programmable gate arrays (FPGAs), systems on a chip (SoCs), etc.) that may each include a plurality of components, including microprocessors, ethernet switch units (ESUs), etc. to enable this communication. Reliability testing of these components may require additional self-tests to ensure that the components operate without failure(s) by, for example, meeting functional safety standards like International Organization for Standardization (ISO) 26262. Conventionally, much of the hardware used in IVNs do not provide power-on-self-test (POST) or built-in self-test (BIST) features that are conventionally performed in non-IVN environments to ensure reliability of these components. Further, even if IVN hardware was configured to perform these self-tests when vehicles were to startup, these self-tests (e.g., a full OEM POST) would greatly increase the vehicles startup time (as self-tests are configured to test, for example, entire blocks of memory) compared to typical startup times of vehicles that do not perform the self-tests. In a more detailed example, after a user presses a start button of a connected vehicle that performs these self-tests, the startup time of the connected vehicle would take a longer time than if the tests were not performed.

To address implementing self-tests for IVN hardware, without increasing a typical startup time of a connected vehicle, the techniques herein establish a new mechanism for component self-tests for an IVN of a connected vehicle. Notably, a software assistant of an IVN may be configured to cause a hardware component of the IVN to progressively perform a POST, where the POST tests only segments of the memory at individual startups of a connected vehicle. Further, the software assistant may be configured to progressively perform a BIST (e.g., loopback tests) on individual ports of switches of the hardware component when the individual ports are idle (and skipping non-idle, active ports). By progressively performing the POST and the BIST, a startup time of the connected vehicle (e.g., when it is turned) is minorly impacted, if at all.

Specifically, according to one or more embodiments of the disclosure as described in detail below, performing component self-tests for an in-vehicle network of a vehicle may illustratively comprise retrieving, by a device in communication with an in-vehicle network (IVN) of a vehicle, a memory sector address of a memory of a component connected to the IVN when a first startup of the vehicle begins, the memory sector address stored in non-volatile memory; performing, by the device, a memory test on a first part of the memory starting at the memory sector address for a predetermined increment during the first startup of the vehicle; and replacing, by the device, the memory sector address with an incremented memory sector address in the non-volatile memory, the incremented memory sector address indicative of the memory sector address incremented by the predetermined increment.

Illustratively, the techniques described herein may be performed by hardware, software, and/or firmware, such as in accordance with the self-test process 248, which may include computer executable instructions executed by the processor 220 (or independent processor of interfaces 210) to perform functions relating to the techniques described herein.

Figure 3:
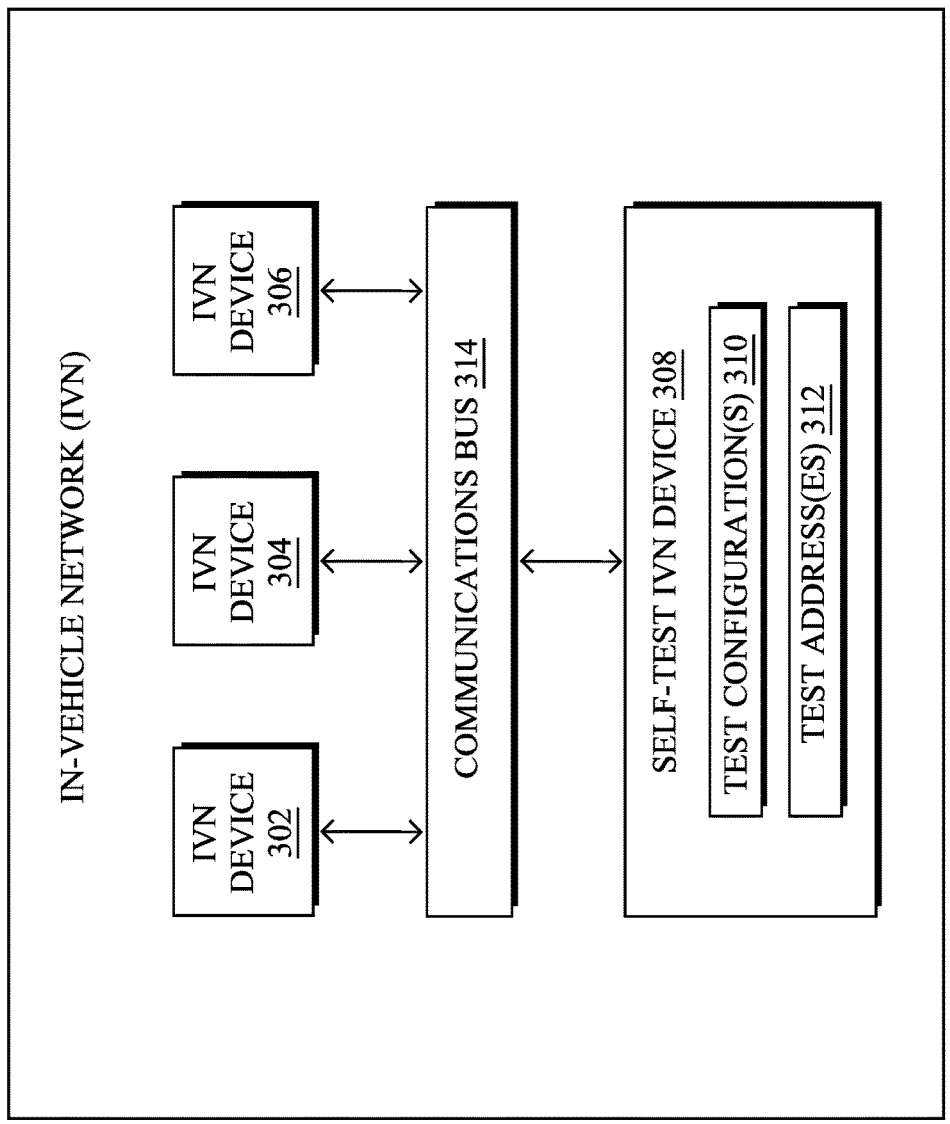
FIG. 3 illustrates an example architecture of an in-vehicle network (IVN) of a connected vehicle that includes components that perform component self-tests.

Operationally, FIG. 3 illustrates a simplified example of an in-vehicle network (IVN) 300 of a connected vehicle that includes components that perform component self-tests. In particular, the IVN 300 may include a plurality of IVN devices (and/or components) 302-306 that may each include a memory and a switch with at least one port. Each of the IVN devices 302-306 may be (or be part of), for example, an engine control system, an anti-lock braking system, a navigation system, etc. of the connected vehicle. The IVN 300 may also include a self-test IVN device 308 that includes test configuration(s) store 310 and test address(es) store 312. Further, the IVN may include at least one communications bus 314 that are used by the IVN devices 302-306 and the self-test IVN device 308 to send and/or receive communications among each other by way of the at least one communications bus 314.

The self-test IVN device 308 may be configured to cause each of the IVN devices 302-306 to perform the self-test(s) described herein (the self-test IVN device 308 may execute a software assistant that causes the performance of the self-test(s)). In particular, the self-test device 308 may cause an IVN device 302 to perform a memory test stored in the test configuration(s) store 310 on a memory of the IVN device 302 and/or a loopback test on a port of the device 302. In an example, the memory test may comprise a POST that tests the reliability and/or functionality of the IVN device 302. The memory test may begin when a vehicle, on which the IVN 300 is installed, begins a startup that activates the IVN 300 and the IVN devices 302-306 (e.g., when a user presses a start button on the vehicle). Subsequent to the startup of the vehicle, the self-test device 308 may execute a software assistant for self-tests (e.g., the self-test process 248) that retrieves a test configuration file(s) that is associated with the IVN device 302. The test configuration file may be, for example, stored as a hardware description file (HDF). The test configuration file may include a number of conditions, criteria, thresholds, etc. which when met and/or not met indicate that the IVN device is correctly operating or displaying erroneous behavior. In an example, as described in greater detail herein with reference to FIG. 4, the test configuration file may include a subset of pre-tests that test particular regions of a memory of the IVN device. Further, it is to be understood that the test configuration(s) store 310 may store a plurality of test configuration files, of which each are designed and/or customized for a corresponding IVN device in the plurality of configuration devices 302-306.

The test configuration file includes a description of a region of a memory of the IVN device 302 that can be tested by a memory self-test (e.g., a POST that is configured to detect defects or faults of the IVN device 302 like a reliability issues, operational faults, etc.) as well as an increment that sets a limitation, in time, memory, etc. for a duration of the memory test. Further, as well be described in greater detail herein below, the test configuration file may also include an indication of a loopback capability supported by the IVN device 302 (which may be tested by a loopback test). The IVN self-test device 308 may analyze the description of the test configuration file to identify memory test requirements (e.g., criteria, thresholds, etc.) that the parts or some of the memory of the IVN device 302 need to satisfy. The IVN self-test device 308 may also retrieve a memory sector address of the memory of the IVN device 302 from the test address(es) store 312, where the memory sector address identifies a starting point for the memory test (e.g., a POST) for the IVN device 302. In an example, the memory sector address may be a bitmap of the memory of the IVN device 302. The test address(es) store 312 can be a form of memory that, even when the IVN 300 (or the vehicle on which the IVN 300 is operating on) is turned off, persistently stores the memory sector address, unless modified by the self-test IVN device 308. In an example, test address(es) store 312 is non-volatile memory. Further, it is to be understood that the test address(es) store 312 may store a plurality of memory sector addresses, of which each are indicative of a starting point for a memory test of a corresponding IVN device.

The IVN self-test device 308 may then perform the memory test beginning at the memory sector address, where the memory test is bound by a predetermined increment (as stored in the test configuration file and as described in greater detail herein below). The predetermined increment may be for a time, size of the memory, etc. that would not adversely affect the startup time of the vehicle (e.g., would not take longer than other self-tests that may be performed on the IVN, sub-systems of the vehicle, etc.). Performing the memory test may identify defects and/or reliability issues of the IVN device 302, as indicated by the test configuration file. If a defect and/or a reliability issue is identified, the IVN self-test 308 may perform various mitigation (remediation) actions, such as remediating against those issues, alarms, reports, displays (e.g., on a graphical user interface (GUI)), etc.

After performing the memory test, the IVN self-test device 308 may then update the test configuration file with results of the memory test. In addition, the IVN self-test device 308 may replace the previously stored memory sector address in the test address(es) store 312 with an updated memory sector address (that is indicative of the memory sector address incremented by the predetermined increment). When a vehicle, on which the IVN 300 is installed, begins a new startup that activates, the self-test IVN device 308 may repeat the steps as described above for testing the memory of the IVN device 302. The memory test would begin at the updated memory sector address that is stored in the test address(es) store 312.

In addition, in situations where the test configuration file includes an indication that the IVN device 302 supports loopback capability, the IVN self-test device 308 may be configured to initiate a loopback test on a port of the IVN device 302 (e.g., an idle port of an ethernet switch of the IVN device 302). Similar to as described above, the test address(es) store 312 of self-test IVN device 308 may store a starting port address for which a loopback test (indicated in the test configuration file) is to begin (e.g., in a bitmap). The self-test IVN device 308 may be configured to perform the loopback test on only ports that are idle and to skip active ports. Generally, the loopback test comprises determining whether data traffic on the port complies or violates an access control list (ACL) or access rights lists (ARL) that define appropriate activity and/or inappropriate activity for a corresponded IVN device. If data traffic on the port violates the ACL and/or ARL, the IVN self-test 308 may perform various mitigation (remediation) actions, such as remediating against those issues, alarms, reports, displays (e.g., on a GUI), etc.

Additionally, after performing the loopback test on the port indicated by the port address, the IVN self-test device 308 may be configured to perform the loopback test on a next port (e.g., a port number greater than the previously tested port) by repeating the steps as described above. If a port is skipped due to not being idle (e.g., active) repeatedly by the IVN self-test device 308, it may force a loopback test on the port if, for example, that port has been skipped a predetermined number of times. It is to be understood that a single port or multiple ports may be tested by the loopback test during one startup of the vehicle. The IVN self-test device 308 is configured to actively replace the starting port address in the test address(es) store 312 with an incremented next port address as the loopback test is performed so as to indicate which port is to be tested next. Further, the IVN self-test device 308 may store an indication that certain port has been skipped or not tested (e.g., for being active) in a corresponding test configuration file for the IVN device 302. Because the starting port is actively updated by the self-test device 308, the loopback test, at a new startup of the vehicle, is performed at a port that has not been recently tested.

Figure 4:
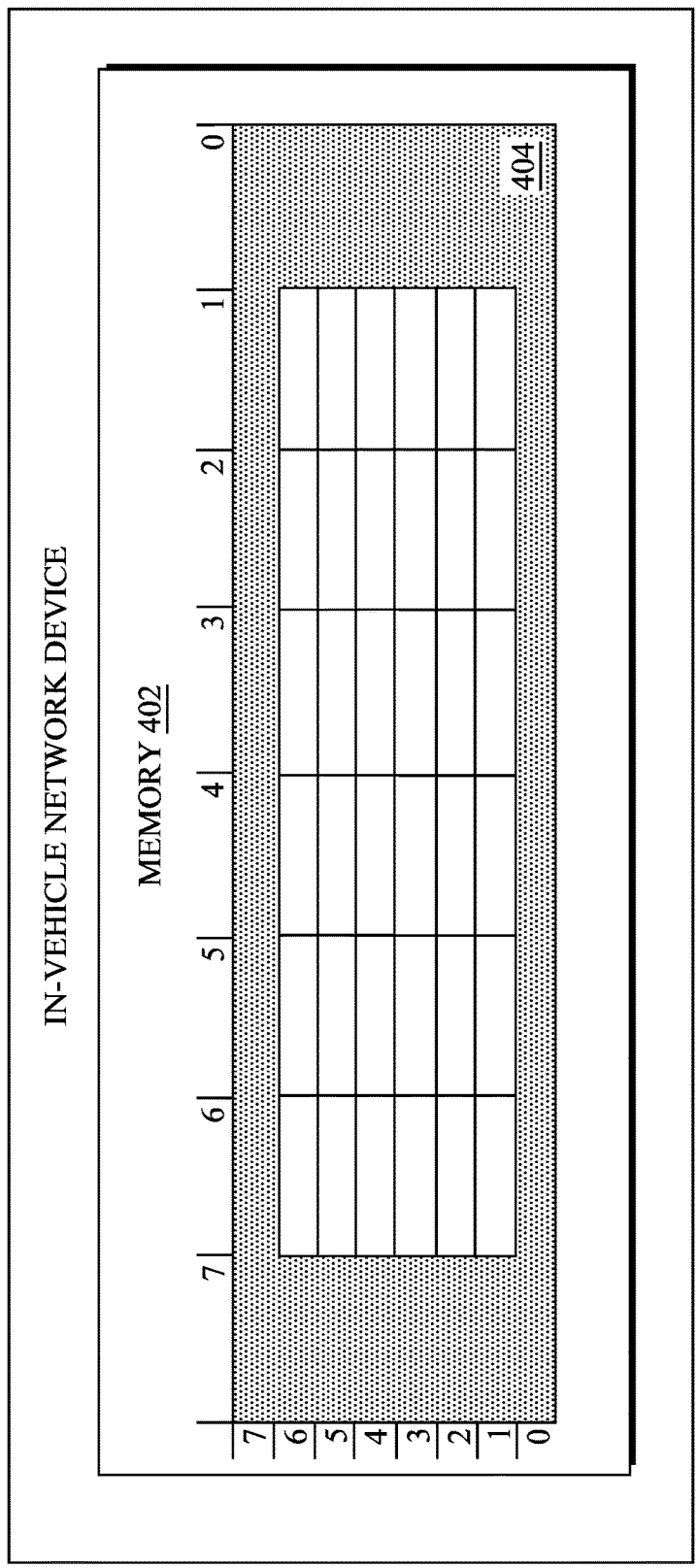
FIG. 4 illustrates an example IVN device.

Turning to FIG. 4, a simplified example IVN device 400 is shown. In particular, the IVN device 400 includes memory 402 that may be tested by, for example, a memory test stored in a test configuration file as described here above. With more detail regarding the IVN self-test device 308, upon each startup of a vehicle and before the progressive memory test described herein above is performed, the IVN self-test device 308 can be configured to execute a subset of pre-tests on specific locations of the memory 302 (e.g., as dictated in the test configuration file). In embodiment where the memory 402 is dynamic random-access memory (DRAM), the IVN self-test device 308 can be configured to a particular region 404 of the memory. Stated another way, the IVN self-test device 308 may "walk" a 1 through the row/column address fields (e.g., 0x000001, 0x000002, 0x000004, 0x000008, etc.) and a 0 through the row/column fields (e.g., 0xFFFFFE, 0xFFFFFD, 0xFFFFFB, 0xFFFFF7, etc.). This the subset of pre-tests may be applied to multiple banks of memory if the memory has the multiple banks. Each of the targeted cells of the memory may have a unique value programmed. The purpose of the subset of pre-tests is to validate that all of the board level connections of the memory (to see if they are non-defective). The subset of pre-tests is particularly well-suited in detecting problems caused by lifted pins of the memory, shorted pins of the memory, missing source termination resistors of the memory, etc. The idea here is to exercise the address decode logic inside the IVN device 302 as much as possible given the time constraints of a "fast boot" that does not impair the conventional startup of the vehicle. Stated another way, the subset of pre-tests performed by the IVN self-test device 308 lessens the chance that malfunctioning logic (e.g., at the transistor level) poisons (or adversely affects) the results of subsequent progressive memory test.

Figure 5:
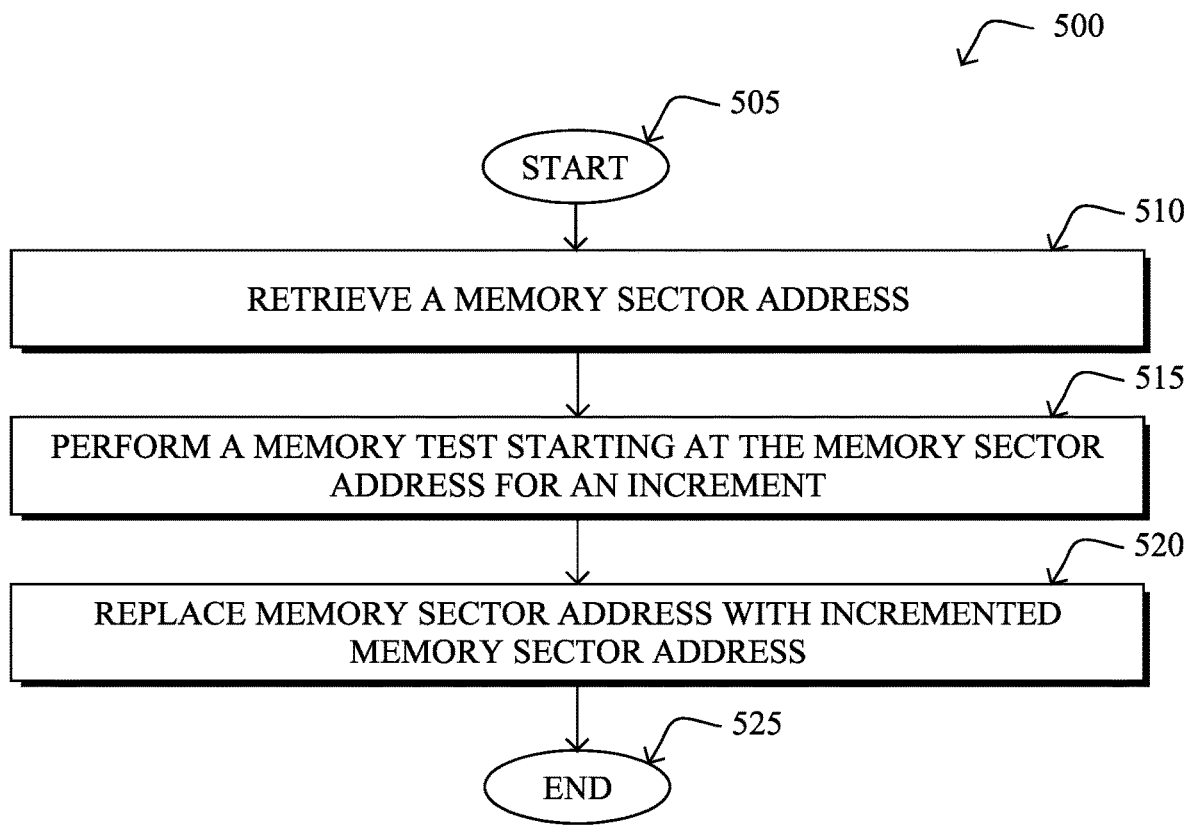
FIG. 5 illustrates an example simplified procedure for performing component self-tests for an IVN of a connected vehicle.

FIG. 5 illustrates an example simplified procedure for performing component self-tests for an IVN of a vehicle in accordance with one or more embodiments described herein. For example, one or more non-generic, specifically configured devices may perform procedure 500 by executing stored instructions (e.g., self-test process 248). The procedure may start at step 505, and continues to step 510, where, as described in greater detail above, a device may retrieve a memory sector address. In particular, the device may be in communication with an in-vehicle network (IVN) of a vehicle. The device may retrieve a memory sector address of a memory of a component connected to the IVN when a first startup of the vehicle begins, the memory sector address stored in non-volatile memory. The component connected to the IVN may be a microcontroller, an ethernet switch unit (ESU), and a networked node. The memory sector address may be stored as a bitmap.

In step 515, the device may perform a memory test starting at the memory sector address for an increment. The device may perform the memory test on a first part of the memory starting at the memory sector address for a predetermined increment during the first startup of the vehicle. The memory test may detect a defect in the memory that is selected from the group consisting of: a lifted pin of the memory, a shorted pin of the memory, and a missing source termination resistor of the memory. The memory test may be a POST and stored as an HDL.

In step 520, the device may replace memory sector address with incremented memory sector address. The device may replace the memory sector address with an incremented memory sector address in the non-volatile memory, the incremented memory sector address indicative of the memory sector address incremented by the predetermined increment. The device may be configured to repeat steps 510-520 where the incremented memory sector address is used as a starting point (in lieu of the memory sector address). In particular, the device may retrieve the incremented memory sector address when a second startup of the vehicle begins. The device may then perform the memory test on a second part of the memory starting at the incremented memory sector address for the predetermined increment during the second startup of the vehicle.

The illustrative procedure 500 may then end in step 525.

It should be noted that certain steps within procedure 500 may be optional as described above, and the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

In one embodiment, the device, as described with respect to procedure 500, may be further configured to retrieve a port address of a first port of the component connected to the IVN when the first startup of the vehicle begins, the port address stored in non-volatile memory. The device may perform a loopback test on the first port when the first port is detected as idle during the first startup of the vehicle. The device may replace the port address with a new port address of a second port of the component in the non-volatile memory. The device may perform the loopback test on the first port when the first port is detected as not idle for a predetermined amount of time. The loopback test may comprise making a determination as to whether a violation of an access control list (ACL) or an access rights list (ARL) has occurred.

In addition, the device may retrieve the new port address of the second port of the component when a second startup of the vehicle begins and perform the loopback test on the second port when the second port is detected as idle during the second startup of the vehicle.

The techniques described herein, therefore, provide for component self-tests for an IVN of a vehicle. By progressively testing regions of memory of components of the IVN, as many regions possible of the memory can be tested without violating startup time constraints (of the vehicle). This can be accomplished through the use of non-volatile memory to store memory sector addresses of the memory (which are indicators of what regions to test next). The testing of every bit in every cell of the memory can still optionally still take place during special circumstances, such as repair shop visits for the vehicle.

While there have been shown and described illustrative embodiments that provide component self-tests for an IVN of a vehicle, it is to be understood that various other adaptations and modifications may be made within the intention and scope of the embodiments herein. For example, while certain formats are shown, such as HDF, other suitable formats may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intention and scope of the embodiments herein.

What is claimed is:

1. A method, comprising:
retrieving, by a device in communication with an in-vehicle network (IVN) of a vehicle, a memory sector address of a memory of a component connected to the IVN when a first startup of the vehicle begins, the memory sector address stored in a non-volatile memory;
performing, by the device, a memory test on a first part of the memory starting at the memory sector address for a predetermined increment during the first startup of the vehicle; and
replacing, by the device, the memory sector address with an incremented memory sector address in the non-volatile memory, the incremented memory sector address indicative of the memory sector address incremented by the predetermined increment.

2. The method of claim 1, further comprising:
retrieving, by the device, the incremented memory sector address when a second startup of the vehicle begins; and
performing, by the device, the memory test on a second part of the memory starting at the incremented memory sector address for the predetermined increment during the second startup of the vehicle.

3. The method of claim 1, wherein the memory test detects a defect in the memory that is selected from the group consisting of: a lifted pin of the memory, a shorted pin of the memory, and a missing source termination resistor of the memory.

4. The method of claim 1, further comprising:
retrieving, by the device, a port address of a first port of the component connected to the IVN when the first startup of the vehicle begins, the port address stored in the non-volatile memory;
performing, by the device, a loopback test on the first port when the first port is detected as idle during the first startup of the vehicle; and
replacing, by the device, the port address with a new port address of a second port of the component in the non-volatile memory.

5. The method of claim 4, further comprising:
retrieving, by the device, the new port address of the second port of the component when a second startup of the vehicle begins; and
performing, by the device, the loopback test on the second port when the second port is detected as idle during the second startup of the vehicle.

6. The method of claim 4, further comprising:
performing, by the device, the loopback test on the first port when the first port is detected as not idle for a predetermined amount of time.

7. The method of claim 4, wherein the loopback test comprises making a determination as to whether a violation of an access control list (ACL) or an access rights list (ARL) has occurred.

8. The method of claim 1, wherein the component connected to the IVN is selected from the group consisting of: a microcontroller, an ethernet switch unit (ESU), and a networked node.

9. The method of claim 1, wherein the memory sector address is stored as a bitmap.

10. The method of claim 1, wherein the memory test is a power-on-self-test (POST).

11. The method of claim 1, wherein the memory test is stored as a hardware description file (HDF).

12. An apparatus, comprising:
one or more network interfaces to communicate with an in-vehicle network (IVN) of a vehicle;
a processor coupled to the network interfaces and configured to execute one or more processes; and
an apparatus memory configured to store a process executable by the processor, the process when executed operable to:
retrieve a memory sector address of a memory of a component connected to the IVN when a first startup of the vehicle begins, the memory sector address stored in a non-volatile memory;
perform a memory test on a first part of the memory starting at the memory sector address for a predetermined increment during the first startup of the vehicle; and
replace the memory sector address with an incremented memory sector address in the non-volatile memory, the incremented memory sector address indicative of the memory sector address incremented by the predetermined increment.

13. The apparatus of claim 12, the process when executed further operable to:
retrieve the incremented memory sector address when a second startup of the vehicle begins; and
perform the memory test on a second part of the memory starting at the incremented memory sector address for the predetermined increment during the second startup of the vehicle.

14. The apparatus of claim 12, wherein the memory test detects a defect in the memory that is selected from the group consisting of: a lifted pin of the memory, a shorted pin of the memory, and a missing source termination resistor of the memory.

15. The apparatus of claim 12, the process when executed further operable to:
retrieve a port address of a first port of the component connected to the IVN when the first startup of the vehicle begins, the port address stored in non-volatile memory;
perform a loopback test on the first port when the first port is detected as idle during the first startup of the vehicle; and
replace the port address with a new port address of a second port of the component in the non-volatile memory.

16. The apparatus of claim 15, the process when executed further operable to:
retrieve the new port address of the second port of the component when a second startup of the vehicle begins; and
perform the loopback test on the second port when the second port is detected as idle during the second startup of the vehicle.

17. The apparatus of claim 15, the process when executed further operable to:
perform the loopback test on the first port when the first port is detected as not idle for a predetermined amount of time.

18. The apparatus of claim 15, wherein the loopback test comprises making a determination as to whether a violation of an access control list (ACL) or an access rights list (ARL) has occurred.

19. The apparatus of claim 12, wherein the component connected to the IVN is selected from the group consisting of: a microcontroller, an ethernet switch unit (ESU), and a networked node.

20. A tangible and non-transitory computer-readable medium storing program instructions, when executed by a device in communication with an in-vehicle network (IVN) of a vehicle cause the device to execute a process comprising:
retrieving a memory sector address of a memory of a component connected to the IVN when a first startup of the vehicle begins, the memory sector address stored in a non-volatile memory;
performing a memory test on a first part of the memory starting at the memory sector address for a predetermined increment during the first startup of the vehicle; and
replacing the memory sector address with an incremented memory sector address in the non-volatile memory, the incremented memory sector address indicative of the memory sector address incremented by the predetermined increment.

* * * * *